US012002609B2

(12) United States Patent
Koenig et al.

(10) Patent No.: US 12,002,609 B2
(45) **Date of Patent: *Jun. 4, 2024**

(54) TEMPERATURE-STABLE SOFT-MAGNETIC POWDER

(71) Applicant: BASF SE, Ludwigshafen am Rhein (DE)

(72) Inventors: Rene Koenig, Ludwigshafen (DE); Rastko Joksimovic, Ludwigshafen (DE); Ingo Muenster, Ludwigshafen (DE); Volker Klock, Ludwigshafen (DE); Jae Hyung Hwang, Ludwigshafen (DE); Moritz Ehrenstein, Ludwigshafen (DE); Eike Hupe, Langenberg (DE); Joachim Nilges, Ludwigshafen (DE); Ralf Liebscher, Ludwigshafen (DE); Christoffer Kieburg, Ludwigshafen (DE)

(73) Assignee: BASF SE, Ludwigshafen am Rhein (DE)

( * ) Notice: Subject to any disclaimer, the term of this patent is extended or adjusted under 35 U.S.C. 154(b) by 675 days.

This patent is subject to a terminal disclaimer.

(21) Appl. No.: 17/259,368

(22) PCT Filed: Jul. 9, 2019

(86) PCT No.: PCT/EP2019/068392

§ 371 (c)(1),
(2) Date: Jan. 11, 2021

(87) PCT Pub. No.: WO2020/011779

PCT Pub. Date: Jan. 16, 2020

(65) Prior Publication Data

US 2021/0291264 A1 Sep. 23, 2021

(30) Foreign Application Priority Data

Jul. 11, 2018 (EP) .................................... 18182824

(51) Int. Cl.

| | |
|---|---|
| ***H01F 1/33*** | (2006.01) |
| ***B22F 1/10*** | (2022.01) |
| ***B22F 1/16*** | (2022.01) |
| ***H01F 1/147*** | (2006.01) |

(52) U.S. Cl.
CPC .................. *H01F 1/33* (2013.01); *B22F 1/16* (2022.01); *H01F 1/147* (2013.01); *B22F 1/10* (2022.01)

(58) Field of Classification Search
CPC .... H01F 1/33; H01F 1/147; B22F 1/16; B22F 1/10
See application file for complete search history.

(56) References Cited

U.S. PATENT DOCUMENTS

| | | | | |
|---|---|---|---|---|
| 10,373,748 | B2 * | 8/2019 | Pagano | ..................... H01F 1/26 |
| 2012/0268226 | A1 | 10/2012 | Nakamura et al. | |
| 2016/0276078 | A1 * | 9/2016 | Pagano | ............... H01F 41/0246 |

FOREIGN PATENT DOCUMENTS

| | | | |
|---|---|---|---|
| DE | 3428121 | A1 | 2/1986 |
| DE | 3940347 | A1 | 6/1991 |
| DE | 19807634 | A1 | 11/1998 |
| EP | 2871646 | A1 | 5/2015 |
| RU | 2070941 | C1 | 12/1996 |
| RU | 2658648 | C2 | 6/2018 |
| SU | 1765240 | A1 | 9/1992 |
| WO | 2015/067608 | A1 | 5/2015 |
| WO | 2020/011779 | A1 | 1/2020 |

OTHER PUBLICATIONS https://ru.wikipedia.org/wiki%D0%A5%D0%B8%D0%BC%D0%B8%D1%87%D0%B5%D1%81%D0%BA%D0%B0%D1%8F_%D1%84%D0%BE%D1%80%D0%BC%D1%83%D0%BB%D0%B0.

International Preliminary Report on Patentability received for PCT Patent Application No. PCT/EP2019/068392, dated Oct. 15, 2020, 15 pages.

International Search Report and Written Opinion received for PCT Patent Application No. PCT/EP2019/068392, dated Oct. 18, 2019, 8 pages.

* cited by examiner

*Primary Examiner* — C Melissa Koslow
(74) *Attorney, Agent, or Firm* — Faegre Drinker Biddle & Reath LLP

(57) ABSTRACT

A soft-magnetic powder coated with a silicon-based coating, wherein the silicon-based coating comprises at least one fluorine containing composition of formula (I), $Si_{1-0.75c}M_cO_{2-0.5c}F_d$ (I), wherein c is in the range of 0.01 to 0.5, d is in the range of 0.04 to 2, and M is B or Al.

15 Claims, No Drawings

TEMPERATURE-STABLE SOFT-MAGNETIC POWDER

CROSS-REFERENCE TO RELATED APPLICATIONS

This application is a national stage application (under 35 U.S.C. § 371) of International Application No. PCT/EP2019/068392, filed Jul. 9, 2019, which claims benefit of European Application No. 18182824.5, filed on Jul. 11, 2018. The entire contents of both applications are incorporated herein by reference in their entireties.

The invention relates to a soft-magnetic powder and a process of coating the soft-magnetic powder. The invention further relates to the use of such soft-magnetic powder and an electronic component including such soft-magnetic powder.

A popular application of soft-magnetic powder includes magnetic core components, which serve as piece of magnetic material with a high permeability used to confine and guide magnetic fields in electrical, electromechanical and magnetic devices such as electromagnets, transformers, electric motors, inductors and magnetic assemblies. These components are usually produced in different shapes and sizes by molding soft-magnetic powder in a die under high pressure.

In electronic applications, particularly in alternating current (AC) applications, the two key characteristics of the magnetic core component are the magnetic permeability and the core loss characteristic. In this context, the magnetic permeability of a material provides an indication of its ability to become magnetized or its ability to carry a magnetic flux. Permeability is defined as the ratio of the induced magnetic flux to the magnetizing force or field intensity. When a magnetic material is exposed to a rapidly varying field, the total energy of the core is reduced by the occurrence of hysteresis losses and/or eddy current losses. The hysteresis loss is caused by the necessary expenditure of energy to overcome the retained magnetic forces within the core component. The eddy current loss is caused by the production of electric currents in the core component due to the changing flux caused by AC conditions and basically results in a resistive loss.

Generally, devices for high frequency applications are sensitive to core losses and in order to reduce losses due to eddy currents good insulation of the soft-magnetic powder particles is desired. The simplest way of achieving this is thickening an insulating layer for each particle. However, the thicker the insulation layer is, the lower the core density of soft-magnetic particles gets and the magnetic flux density decreases. Thus, in order to manufacture a soft-magnetic powder core having optimal key characteristics, it is necessary to increase the resistivity and the density of the core simultaneously.

Another aspect of the insulation concerns temperature performance and durability of the insulation layer. Particularly high temperatures can result in degradation of the insulation layer by developing cracks which promote eddy current losses. Thus temperature stability is a further requirement to manufacture a soft-magnetic powder core with optimal characteristics. Ideally particles would be covered with a thin insulating layer providing a high resistivity and a high density with a stable temperature performance.

Known processes for forming insulating layers on magnetic particles typically tackle one of the key characteristics, i.e. the density or the resistivity. However, if the particles coated with the insulation layer are subject to temperatures over 120° C., preferably over 150° C., for a couple of hours the insulation layer can develop cracks, which lead to higher eddy currents and lower resistivity values.

EP 2 871 646 A1 provides a soft-magnetic powder coated with a silicon-based coating which exhibits good properties with respect to temperature stability as well as resistivity. This is achieved by specific silicon-based coatings comprising fluorine in certain amounts. EP 2 871 646 A1 further discloses a process for preparing the coated soft-magnetic powder. However, in view of increasing demands to coated soft-magnetic powders, in particular with respect to heat stability, there is still a need in the art to further improve the insulation layer of soft-magnetic powder in order to reach optimal results for magnetic core components prepared from such powders. Moreover, improvements in the process for coating the soft-magnetic powder are desirable.

Therefore, it is an object of the invention to provide an improved coated soft-magnetic powder and a corresponding process for coating a soft-magnetic powder that facilitates to achieve good temperature stability, high resistivity and high permeability when utilized in magnetic core components. Furthermore, it is an object of the invention to provide a process which allows to achieve aforementioned goals in a simple, cost-effective and uncomplicated manner. Another object of the invention is to provide electronics components including soft-magnetic powder with good temperature stability, high resistivity and high permeability.

These objects are achieved by a soft-magnetic powder coated with a silicon-based coating, wherein the silicon-based coating comprises at least one fluorine containing composition of formula (I):

$$Si_{1-0.75c}M_cO_{2-0.5c}F_d \quad (I)$$

wherein c is in the range of 0.01 to 0.5, d is in the range of 0.04 to 2, and

M is B or Al.

The invention further relates to a process for coating a soft-magnetic powder, wherein the soft-magnetic powder is mixed with a silicon based solution containing a soluble fluorination agent. The invention further relates to a soft-magnetic powder obtained by the process for coating or a soft-magnetic powder coated according to the process. The invention also concerns the use of the coated soft-magnetic powder for manufacturing electronic components, in particular magnetic core components, as well as an electronic component, in particular a magnetic core component, including the coated soft-magnetic powder.

The following description concerns the coated soft-magnetic powder as well as the process for coating the soft-magnetic powder proposed by the invention. In particular, embodiments of the soft-magnetic powder, the fluorine containing composition and the soluble fluorination agent apply to the coated soft-magnetic powder, to the process for coating the soft-magnetic powder and the coated soft-magnetic compound obtained by the process alike.

The invention provides a process for coating soft-magnetic powder and the corresponding coated powder which is optimally suitable for manufacturing electronic components. In particular, the soft-magnetic powder coated according to the invention allows to achieve high temperature durability, high resistivity and high permeability when used for manufacture of electronic components, such as magnetic core components. Furthermore, owing to the simple and uncomplicated manner of the proposed method, a high batch-to-batch consistency can be achieved, which again allows for reliable production of electronic components. Overall, the soft-magnetic powder coated according to the invention facilitates to prepare electronic components with unique electromagnetic performance characteristics and high temperature durability, particularly for temperatures >120° C. and preferred >150° C. such as >175° C.

In the context of the present invention, the individual components, e. g. Si, O, F, of the fluorine containing compositions may be evenly distributed throughout the silicon based coating. In this case, the fluorine containing compositions as specified herein indicate the composition of the homogeneous silicon based coating. Alternatively, the silicon based coating may be inhomogeneous. In such a case the individual components of the fluorine containing compositions as specified herein indicate a mean of the composition of the silicone based coating across the coating. For example, the silicon based coating may contain one or more layers of silicon dioxide ($SiO_2$) and one or more layers further containing a fluorine component. The fluorine containing compositions as specified herein then indicate a mean composition of the layered or inhomogeneous silicon based coating.

In the context of the present invention specifications in % by weight (wt.-%) refer to the fraction of the total weight of soft-magnetic powder unless otherwise specified. For instance, the solution for coating the soft-magnetic powder includes a soluble fluorination agent as specified above and optionally further components such as a solvent. Here wt.-% refers to the fraction of total weight of soft-magnetic powder to be treated with the solution, unless explicitly stated otherwise. Hence indications in wt.-% are based on the total weight of soft-magnetic powder excluding other components e.g. from the solution.

The soft-magnetic powder of the present invention includes a plurality of particles composed of a soft-magnetic material. Such powders comprise particles with a mean size between 0.5 and 250 μm, preferably between 2 and 150 μm, more preferably between 2 and 10 μm. These particles may vary in shape. In respect of the shape, numerous variants known to the person skilled in the art are possible. The shape of the powder particles may, for example, be needle-shaped, cylindrical, plate-shaped, teardrop-shaped, flattened or spherical. Soft-magnetic particles with various particle shapes are commercially available. Preferred is a spherical shape as such particles can be coated more easily, which in fact results in a more effective insulation against electrical current.

As soft-magnetic material an elemental metal, an alloy or a mixture of one or more elemental metal(s) with one or more alloy(s) may be employed. Typical elemental metals comprise Fe, Co, and Ni. Alloys may include Fe-based alloys, such as Fe—Si alloy, Fe—Si—Cr alloy, Fe—Si—Ni—Cr alloy, Fe—Al alloy, Fe—N alloy, Fe—Ni alloy, Fe—C alloy, Fe—B alloy, Fe—Co alloy, Fe—P alloy, Fe—Ni—Co alloy, Fe—Cr alloy, Fe—Mn alloy, Fe—Al—Si alloy, and ferrites, or rare earth based alloy, particularly rare earth Fe-based alloy, such as Nd—Fe—B alloy, Sn—Fe—N alloy or Sm—Co—Fe—Cu—Zr alloy, or Sr-ferrite, or Sm—Co alloy. In a preferred embodiment Fe or Fe-based alloys, such as Fe—SiCr, Fe—Si or Fe—Al—Si, serve as soft-magnetic material.

In a particularly preferred embodiment Fe serves as soft-magnetic material and the soft-magnetic powder is a carbonyl iron powder (also referred to as CIP herein). Carbonyl iron can be obtained according to known processes by thermal decomposition of iron pentacarbonyl in a gas phase, as described, for example, in Ullmann's Encyclopedia of Industrial Chemistry, 5th Edition, Vol. A 14, page 599 or in DE 3 428 121 or in DE 3 940 347, and contains particularly pure metallic iron.

Carbonyl iron powder is a gray, finely divided powder of metallic iron having a low content of secondary constituents and consisting essentially of spherical particles having a mean particle diameter of up to 10 μm. Unreduced carbonyl iron powder, which is preferred in the present context, has an iron content of >97% by weight (here based on the total weight of the powder), a carbon content of <1.5% by weight, a nitrogen content of <1.5% by weight and an oxygen content of <1.5% by weight. Reduced carbonyl iron powder, which is particularly preferred in the process of the present invention, has an iron content of >99.5% by weight (here based on the total weight of the powder), a carbon content of <0.1% by weight, a nitrogen content of <0.01% by weight and an oxygen content of <0.5% by weight. The mean diameter of the powder particles is preferably from 1 to 10 μm and their specific surface area (BET of the powder particles) is preferably from 0.1 to 2.5 m 2/g.

In one embodiment the silicon based coating contains a fluorine containing composition of formula (I):

$$Si_{1-0.75c}M_cO_{2-0.5c}F_d \quad (I)$$

In the above formula (I) M is B or Al, preferably B.

In the fluorine containing composition of formula (I) the index c is a number in the range from 0.01 to 0.5, preferably in the range from 0.05 to 0.3 and particularly preferably from 0.085 to 0.2.

The index d is a number in the range from 0.04 to 2, preferably in the range from 0.2 to 1.2 and particularly preferably from 0.34 to 0.8.

Preferably, index c and index d have the following relation: d=4 c.

The silicon based coating can preferably comprise between >5 to 45 wt.-%, more preferably 10 to 40 wt.-%, and particularly preferred 20 to 35 wt.-%, based on the total weight of the silicon based coating, of the at least one fluorine containing composition of formula (I).

Other than the silicon based coatings specified above the coating could also be based on metal oxides such as aluminium oxide ($Al_2O_3$), magnesium oxide (MgO) or titanium oxide ($TiO_2$, TiO, $Ti_2O_3$). Such coatings can be produced by decomposition of metal alkoxides. Metal alkoxides are typically given by the formula $M^2$ (OR')(OR") . . . (OR‴), wherein $M^2$ is a metal and n the metal's valence. R', R", R‴ specify organic rests, which can be the same or different. For example r indicates a linear or branch alkyl or a substituted or unsubstituted aryl. Here r indicates a $C_1$-$C_8$ alkyl, such as methyl, ethyl, n-propyl, iso-propyl, n-butyl, iso-butyl, sec.-butyl or tert.-butyl, n-hexyl. 2-ethylhexyl, or a $C_6$-$C_{12}$ aryl, such as phenyl, 2-, 3- or 4-methylphenyl, 2,4,6-trimethylphenyl or naphthyl. Preferred are methyl, ethyl and iso-propyl. Further details regarding the process of coating the soft-magnetic powder with the metal oxide, particularly $SiO_2$, are described below.

Furthermore, the fluorine component of the fluorine containing composition can be embedded within a $SiO_2$ matrix and/or bonded to a surface of a $SiO_2$ coating. The fluorine component of the fluorine containing composition can be homogenously or inhomogenously distributed within the $SiO_2$ matrix. For example, the silicon based coating can include one or more layers of a $SiO_2$ coating and one or more layers of a fluorine containing $SiO_2$ coating. Alternatively or additionally, the fluorine component of the fluorine containing composition can be bonded to the surface of the $SiO_2$ coating surrounding the soft-magnetic powder particles, wherein the $SiO_2$ coating can also contain a fluorine component of the fluorine containing composition.

In a further embodiment the silicon based coating has an average thickness of 2 to 100 nm, preferred 5 to 70 nm and particularly preferred 10 to 50 nm. In addition, the ratio of silicon based coating to the soft-magnetic material is not higher than 0.1 and preferably not higher than 0.02 and preferably the soft magnetic powder comprises 0.1 to 10 wt %, more preferred 0.2 to 3.0 wt % and particularly 0.3 to 1.8 wt % of the silicon based coating based on the total weight of the soft magnetic powder. Thus a significant decrease in magnetic flux density of the magnetic core obtained by molding the soft-magnetic powder can be prevented.

A soluble fluorination agent as used in the process for coating the soft-magnetic powder is a fluorination agent having a solubility in ethanol of more than 15 wt.-%, preferably more than 20 weight-% and particularly preferred more than 25 wt.-% at 0° C. The fluorination agent can alternatively be specified by a very high solubility in water of more than 25 wt.-%, preferred higher than 30 wt.-% and particularly preferred more than 35 wt.-% at 20° C. It was found that fluorination agents having lower solubility are prone to precipitated from the solution if the solution is prepared in advance and stored at ambient temperature. This is typically observed for $BF_3 \cdot NH_2—CH_2$-Ph, which was found to have a solubility in ethanol at 0° C. of about 10 wt.-%. Fluorination agents having a sufficient solubility in ethanol are typically ionic fluorination agent. Alternatively or in addition, it is also particularly preferred if the fluorination agent is a liquid at room temperature and/or may be prepared from constituents which are liquid at room temperature.

In a particular preferred embodiment, the solution of the soluble fluorination agent in ethanol has a pH in the range of 0 to 10, preferably 6 to 9. A pH in the range from 6 to 9, preferably 7 to 9, is preferred in view of the potential corrosion of the equipment used for the preparation (i.e. the reactor) during the coating process. Moreover, the preferred pH ranges allow mild conditions for the coating of the soft-magnetic powder.

Preferably the at least one fluorination agent is of formula (II):

$$[Q][MF_4] \qquad (II)$$

wherein

M is B or Al; and

Q is a cationic group selected from $H^+$, $Na^+$, $K^+$, $Rb^+$, $Cs^+$ or $[NR^1_4]^+$, wherein $R^1$ is independently selected from the group consisting of —H, —$C_{1-12}$-alkyl, —$C_{2-12}$-alkenyl, and —$C_{6-18}$-aryl, each of which may be substituted with at least one group represented by the formula —$OR^2$, wherein $R^2$ is independently selected from —H, —$C_{1-12}$-alkyl, —$C_{2-12}$-alkenyl, and —$C_{1-18}$-aryl.

In a preferred embodiment of the invention M is selected from B in formula (II).

Moreover, preferred embodiments include cationic groups Q selected from $H^+$ or $[NR^1_4]^+$ wherein $R^1$ is defined as above.

In one embodiment, at least one substituent $R^1$ is selected from the group consisting of —$C_{1-12}$-alkyl, —$C_{2-12}$-alkenyl, and —$C_{6-18}$-aryl (i.e. the group defined above excluding —H), each of which may be substituted with at least one group represented by the formula —$OR^2$, wherein $R^2$ is as defined above. In an alternative embodiment, at least two substituents $R^1$ are selected from the group consisting of —$C_{1-12}$-alkyl, —$C_{2-12}$-alkenyl, and —$C_{6-18}$-aryl (i.e. other than —H), each of which may be substituted with at least one group represented by the formula —$OR^2$, wherein $R^2$ is as defined above. In an alternative embodiment, at least three substituents $R^1$ are selected from the group consisting of —$C_{1-12}$-alkyl, —$C_{2-12}$-alkenyl, and —$C_{1-18}$-aryl (i.e. other than —H), each of which may be substituted with at least one group represented by the formula —$OR^2$, wherein $R^2$ is as defined above.

In a further preferred embodiment, the at least one fluorination agent of formula (II) is selected from the group, consisting of $HBF_4$, $[NH_4][BF_4]$, and $[(R^4—O—R^3)_x—NH_{3-x}][BF_4]$, wherein $R^3$ represents a group of the formula —$(C_nH_{2n+p})$—, wherein n is an integer from 1 to 6 and p is an integer selected from 0 and −2;

$R^4$ is selected from —H or —$(C_mH_{2m+q})$—$CH_3$, wherein m is an integer from 0 to 6 and q is an integer selected from 0 and −2, with the proviso that when m=0 then q=0, and x is an integer from 1 to 3.

In one preferred embodiment n is an integer from 1 to 3.

In an alternative preferred embodiment p is 0.

In a further alternative preferred embodiment m is an integer selected from 0 to 2.

In a further alternative preferred embodiment q is 0.

In one embodiment, $R^3$ represents a group selected from —$(CH_2)$—, —$(C_2H_4)$—, —$(C_3H_6)$—, —$(CH_3—CH(CH_3))$—, and preferably represents—$(C_2H_4)$—.

In one embodiment, $R^4$ represents a group selected from —H and —$CH_3$, and preferably represents —H.

In a particular preferred embodiment, the at least one fluorination agent of formula (II) is represented by the formula $[(R^4—O—R^3)_x—NH_{3-x}][BF_4]$, wherein $R^3$ represents a group of the formula —$(C_nH_{2n+p})$—, wherein n is an integer from 1 to 3, and p is 0; and $R^4$ is —H.

In a further particular preferred embodiment, the at least one fluorination agent of formula (II) is represented by the formula $[(R^4—O—R^3)_x—NH_{3-x}][BF_4]$, wherein $R^3$ represents a group selected from —$(CH_2)$—, —$(C_2H_4)$—, —$(C_3H_6)$—, —$(CH_3—CH(CH_3))$—, and preferably represents —$(C_2H_4)$—, and $R^4$ is —H.

In a further embodiment, x is an integer selected from 1 and 2, and in a particular preferred embodiment x represents 1.

Particularly preferably the soluble fluorination agent is selected from the group consisting of $HBF_4$, $[NH_4][BF_4]$, $[HOCH_2—NH_3][BF_4]$, $[HOC_2H_4—NH_3][BF_4]$, $[HOC_3H_6—NH_3][BF_4]$, $[HOC_4H_8—NH_3][BF_4]$, $[HOC_5H_{10}—NH_3][BF_4]$ and $[HOC_6H_{12}—NH_3][BF_4]$. In particular, $[HOC_2H_4—NH_3][BF_4]$ is preferably used as the soluble fluorination agent. These fluorination agents combine superior properties with respect to solubility in ethanol, stability in solution, accessibility and performance as fluorination agent as well as performance of the silicon-based coatings obtained therewith. Moreover, these fluorination agents are characterized by having a lower toxicity compared to fluorination agents such as $H_2 SiF_6$, known from EP 2 871 646 A1.

Compounds of the formula $[(R^4—O—R^3)_x—NH_{3-x}][BF_4]$, may easily be prepared by mixing $HBF_4$ and $R^4—O—R^3—NH_2$ in a ratio of 1:0.5 to 1:4, preferably 1:0.8 to 1:3, more preferably 1:0.9 to 1:2 and in particular 1:1 to 1:1.5, in an appropriate solvent (e.g. ethanol) at room temperature. The obtained solution is typically stable at room temperature and may be stored without deterioration or sedimentation.

The soluble fluorination agents according to the present invention are in particular characterized by being a compound having good solubility in ethanol. In one preferred embodiment, the soluble fluorination agents preferably are liquid compounds or are prepared in situ from liquid compounds, which are therefore easily manageable. The thus obtained solution is well compatible with materials sensitive to corrosion (e.g. reactor surfaces).

In order to coat the soft-magnetic powder with silicon dioxide ($SiO_2$) the silicon based solution preferably contains a silicon alkoxide, which is added to the silicon based solution in one or more steps. Suitable silicon alkoxides are for example tetramethylorthosilicate (TMOS), tetraethylorthosilicate (TEOS), tetrapropylorthosilicate and tetraisopropylorthosilicate or mixtures thereof. Such silicon alkoxides provide a soluble form of silicon without any water or hydroxy groups. Thus, a controlled hydrolyzed silicon product is achievable. Preferred is TEOS as silicon alkoxide. Also suitable are silanes with two or three O—R″ groups, wherein R″ is a rest as given above, and two or one $X^1$ group(s) directly bound to silane, respectively, wherein $X^1$ is a rest such as H, methyl, ethyl, $C_3$ to $C_{18}$ or propylamine, or even more complex examples like (3-glycidyloxypropyl) triethoxysilane as well as mixtures thereof, which may further be mixed with any of the silicon alkoxide mentioned above.

The soft-magnetic powder is preferably mixed with a silicon based solution and the soluble fluorination agent is added after at least partial treatment of the soft-magnetic powder with the silicon based solution. For instance the soluble fluorination agent is added during treatment with the silicon based solution and/or immediately after treatment with the silicon based solution. Here immediately after treatment with the silicon based solution refers to the step directly following the last step of the treatment with the silicon based solution. The last step of the treatment with the silicon based solution typically comprises or consists of distilling and drying the coated soft-magnetic powder thus providing a dry coated soft-magnetic powder. In the step directly after treatment with the silicon based solution a solvent including the fluorination agent can be added to the coated soft-magnetic powder to provide a soft-magnetic powder coated with the silicon based coating including one of the fluorine containing compositions as specified herein.

In principal, the solution could also be based on other metals and contain the corresponding metal alkoxides in order to coat the soft-magnetic powder with a metal oxide. For example the solution could be based on titanium, magnesium (Mg) or aluminum for producing an aluminum oxide ($Al_2O_3$), magnesium oxide (MgO) or titanium oxide ($TiO_2$, TiO, $Ti_2O_3$) coating. Furthermore the solution could be based on a mixture of metals, such as Si, Al, Mg or Ti, and contain the corresponding mixture of metal alkoxides in order to achieve a mixed coating. Preferably the decomposition of the metal alkoxide is carried out by hydrolysis. For the hydrolysis the metal based solution further contains an inert suspending agent, water and potentially a catalyst.

A reaction mixture including the soft-magnetic powder, the metal based solution and optionally the fluorination agent can be prepared stepwise in one or more steps or gradually. Preferably, the reaction mixture is prepared stepwise. In this context, stepwise refers to adding at least one component of the reaction mixture in one or more steps during the hydrolysis, wherein a stepwise addition may also include the addition at a rate over a specified time range. Thus, the components may be added in one step at once. Alternatively components can be added in regular or irregular intervals in at least two steps. Gradually means that components are added at a fixed rate or in regular intervals, for example every minute or second, during the hydrolysis. Preferably the metal alkoxide and/or the fluorination agent are added stepwise.

In a first process step the soft-magnetic powder can be mixed with the inert suspending agent, such as water and/or an organic solvent. Suitable organic solvents are protic solvents, preferably monovalent or divalent alcohols, such as methanol, ethanol, iso-propanol, glycol, diethylene glycol or triethylene glycol, or aprotic solvents, preferably ketones, such as aceton, diketone, ether, e.g. diethyl ether, di-n-butyl ether, dimethyl ether of glycol, diethylene glycol or triethylene glycol, or nitrogenous solvents such as pyridine, piperidine, n-methylpyrrolidine or amino ethanol. Preferably the organic solvent is miscible with water. The suspending agent can be the organic solvent or the organic solvent mixed with water. Preferred organic solvents are acetone, isopropanol and ethanol. Particularly preferred is ethanol. The content of the inert suspending agent in the metal based solution can amount up to 70 wt.-%. Preferably the content of the inert suspending agent lies between 10 and 50 wt.-%.

The mixture of the soft-magnetic powder and the suspending agent is chosen such that a miscible solution is obtained. A high solid fraction is favorable in order to increase yield per volume and time. The optimal solid fraction is easily obtainable through routinely carried out experiments, which allow finding the optimal fraction for the reaction mixture. Furthermore, mechanical stirrers or pump/nozzle-devices can be used to increase the solid fraction.

In a second process step the metal alkoxide can be added to the mixture. The metal alkoxide can be added to the reaction mixture as such or dissolved in the organic solvent. If an organic solvent is used, the organic solvent contains 10 to 90 wt.-%, preferably 50 to 80 wt.-% of the metal alkoxide. The metal alkoxide can be added stepwise or gradually. Preferred is a stepwise addition of the metal alkoxide in more than one step, preferably two steps. For example up to 90%, up to 50% or up to 20% of a total amount of metal alkoxide needed for the hydrolysis is added to the reaction mixture at first and the remaining amount is added at a later stage of the process.

The total amount of metal alkoxide added to the metal based solution depends on the desired thickness of the coating. Depending on the particle size distribution, the profile of the particles (needle like or spherical) and the amount of powder particles added the overall specific surface can easily be determined. Alternatively known methods such as the BET-method can be employed to determine the specific surface area. From the desired thickness of the coating and the density of the metal oxide the required amount of metal oxide can be calculated. The required total amount of metal alkoxide can then be determined through the stoichiometry of the reaction.

After addition of the metal alkoxide the hydrolysis occurs automatically as soon as water is added to the reaction mixture in a third step. Preferably the total amount of water corresponds to at least twice, more preferably to at least five times the amount of the stoichiometric amount needed for the hydrolysis of the metal alkoxide. Generally, the total amount of water is not higher than one hundred times, preferably twenty times the stoichiometric amount needed. In the third step a fraction of the amount of water is added, which corresponds to the fraction of metal alkoxide added to the reaction mixture in the second process step.

In order to further accelerate the hydrolysis a catalyst such as an alkaline or an acidic catalyst can be added to the reaction mixture. The amount of catalyst added can also be adjusted to the fraction of metal alkoxide added to the reaction mixture in the second process step. Suitable acidic catalysts are for example diluted mineral acids such as sulphuric acid, hydrochloric acid, nitric acid, and suitable alkaline catalysts are for example diluted alkaline lye, such as caustic soda. Preferred is the use of diluted aqueous ammonia solution so the catalyst and water are added simultaneously in one step.

The preferred molar ratio of catalyst to metal alkoxide, in particular ammonia to silicon alkoxide, is 1:1 to 1:2, preferably 1:1.1 to 1:1.8. This ratio allows the formation of a coating having good properties.

The decomposition of the metal alkoxide, preferably the silicon alkoxide, can further be promoted by thermally heating the prepared reaction mixture in a fourth process step. The reaction mixture can be heated to a temperature just below the boiling point or up to reflux of the reaction mixture. In the case of ethanol for example the temperature is kept below 80° C., e.g. around 60° C. The reaction mixture can be kept at elevated temperature in reflux for a few hours, for example 3 hours. Typically the reaction mixture is dispersed by a mechanical stirrer. Furthermore dispersing agents such as anionic or ionic surfactants, acrylic resin, pigment disperser or higher alcohols such as hexanol, octanol, nonanol or dodecanol can be added to the reaction mixture.

If the metal alkoxide is added stepwise in more than one step, the remaining fractions of metal alkoxide, water and catalyst can be added in one or more steps while the reaction mixture is kept at elevated temperature. Preferred is a two-step addition of the metal alkoxide, where the remaining fractions of metal alkoxide, water and catalyst are added in one step while the reaction mixture is kept at elevated temperature.

After the hydrolysis the reaction mixture is distilled and dried in a fifth and sixth process step. The point when the hydrolysis finishes can be detected by detecting a decrease in water content in the reflux. Is the water content low enough the mixture can be distilled and dried leaving the soft-magnetic powder coated with $SiO_2$. In this context, the level of water content can easily be determined through routine experiments.

In one embodiment of the process the soluble fluorination agent is added during treatment with the silicon based solution. Hence, the soluble fluorination agent is added before the treatment with the silicon based solution is finished, i.e. before the reaction mixture is distilled and dried.

In a further embodiment $1.0\times10^{-2}$ to $5.5\times10^{-2}$ mol.-% fluorination agent is added to the silicon-based solution based on the total amount of the soft-magnetic powder. Preferably $1.5\times10^{-2}$ to $3.5\times10^{-2}$ mol.-% fluorination agent is used, in particular $1.7\times10^{-2}$ to $2.7\times10^{-2}$ mol.-% fluorination agent.

In a further embodiment 0.1 to 10 mmol of fluorination agent per kg of soft-magnetic powder is added to the silicon-based solution. Preferably 1 to 7 mmol of fluorination agent per kg of soft-magnetic powder is used, in particular 3 to 5 mmol of fluorination agent.

In a further embodiment 0.25 to 5 mol-% of fluorination agent is added to the silicon based solution based on the total amount of Si in the silicon based solution. Preferably 1 to 4.5 mol-% of fluorination agent is used, in particular 1.5 to 3.5 mol-% of fluorination agent.

The fluorination agent can be added as solid or in solution. Preferably, the solution of the fluorination agent has a concentration of about 5 to 30 wt.-%, in particular 10 to 20 wt.-%. Typically the solvent is water, ethanol or the inert suspending agent mentioned before. In a particular preferred embodiment, the solution comprises at least one fluorination agent and at least ethanol.

In a further preferred embodiment, only a part of the silicon alkoxide is added together with the fluorination agent. For example, of 100% silicon alkoxide needed to form 1-2 wt.-% $SiO_2$ on the iron powder, 25%, 50% or 75% is added together with the fluorination agent.

The preferred molar ratio of added fluorine atoms in the soluble fluorination agent to silicon in the added silicon alkoxide (molar ratio F:Si) is 1:3 to 1:18, preferably 1:5 to 1:15, and in particularly 1:8 to 1:13, wherein the molar ratio refers to the ratio across the whole coating. The molar ratio F:Si may for instance be 1:9.1. With this ratio the coating can be adapted to provide high permeability due to the thickness of the coating and good temperature stability.

Furthermore, the soluble fluorination agent can be added stepwise in one or more steps during treatment with the silicon based solution. Preferably the soluble fluorination agent is added in one step. The point when the soluble fluorination agent is added can be chosen somewhere after the second process step, i.e. after adding the metal alkoxide, and before the fifth process step, i.e. before distilling and drying. Preferably, the soluble fluorination agent is added while the reaction mixture is kept at elevated temperature. Particularly preferred, the soluble fluorination agent is added before the remaining fraction of metal alkoxide is added while the reaction mixture is kept at elevated temperature. Thus, the soluble fluorination agent can be added after at least 20%, preferably at least 50% and particularly preferred at least 70% of the reactants for the hydrolysis, for example the metal alkoxide, has been added.

The process described above is a preferred embodiment. However, the sequence of process steps can vary. The metal alkoxide can for example be added to the reaction mixture including the soft-magnetic powder, the inert suspending agent, water and the catalyst simultaneously or the water and the metal alkoxide can be added simultaneously. However, in such embodiments a stepwise addition of the metal alkoxide in more than one step is preferred, wherein the soluble fluorination agent is added at once as described above.

Alternatively or additionally the soluble fluorination agent is added immediately after the treatment with the silicon based solution. If the soluble fluorination agent is added immediately after the treatment with the silicon based solution, the soft-magnetic powder is treated by the silicon based solution including or excluding the soluble fluorination agent. The coated soft-magnetic powder can be mixed with a solvent, such as ethanol, and the soluble fluorination agent in the process step following the alkoxide coating process.

The soft-magnetic powder coated according to the processes described above and the coated soft-magnetic powder as specified is characterized by having improved permeability combined with unaltered or even improved temperature stability compared to the prior art materials disclosed in EP 2 871 646 A1.

The soft-magnetic powder coated according to the processes described above and the coated soft-magnetic powder as specified above are particularly suitable for the manufacture of electronic components. Electronic components such as magnetic cores may be obtained by e.g. press molding or injection molding the coated soft-magnetic powder. To manufacture such electronic components, the coated soft-magnetic powder is typically incorporated with one or more types of resin, such as epoxy resin, urethane resin, polyurethane resin, phenolic resin, amino resin, silicon resin, polyamide resin, polyimide resin, acrylic resin, polyester resin, polycarbonate resin, norbornene resin, styrene resin, polyether sulfone resin, silicon resin, polysiloxane resin, fluororesin, polybutadiene resin, vinyl ether resin, polyvinyl chloride resin or vinyl ester resin. The method of mixing these components is not limited, and the mixing may be effected by a mixer, e.g. ribbon blender, tumbler, Nauta mixer, Henschel mixer or supermixer or kneading machine, e.g. Banbury mixer, kneader, roll, kneader-ruder, paddle mixer, planetary mixer or monoaxial or biaxial extruder.

To produce a molding, the soft-magnetic powder can be mixed with one or more types of resin in order to provide a mold powder or ready to press powder. For a mold powder a mixture of coated soft-magnetic powder and resin can be heated and molten at a melting point of the resin, preferably the thermoplastic resin, and then formed into an electronic component, such as a magnetic core of desired shape. Preferably the mixture is compressed in a mold to give a magnetic or magnetisable molding. The compression produces a molding which has high strength and good temperature stability.

Another method to produce the molding includes ready to press powder, which contains a coated soft-magnetic powder further coated with a resin. Such ready to press powder can be pressed in a mold at pressures up to 1000 MPa, preferably up to 500 MPa with or without heating. After compression the molding is left to cure. A process to coat the soft-magnetic powder with resin comprises for example the steps of dissolution of the resin, e.g. epoxy resin, in a solvent, addition of a soft-magnetic powder to the mixture, removal of the solvent from the mixture to give a dry product, and grinding of the dry product to give a powder. The ready to press powder is used to produce a magnetic or magnetisable molding.

Powder injection molding allows to produce complex metal parts cost effectively and efficiently. Powder injection molding typically includes moulding the soft-magnetic powders together with a polymer as adhesive into the desired shape, the adhesive is then removed and the powder is compacted into a solid metal part in the sintering phase. This works particularly well with carbonyl-iron powder because the spherical iron particles can be packed together very tightly.

The soft-magnetic powder treated according to the processes described above or containing a silicon based coating with fluorine containing compositions as described above may be used in electronic components. Particularly moldings of this type can be used as coil cores or coil formers as employed in electrical engineering. Coils with corresponding coil cores or coil formers are used by way of example as electromagnets, in generators, in transformers, in inductors, in laptop computers, in netbooks, in mobile telephones, in electric motors, in AC inverters, in electronic components in the automobile industry, in toys, and in magnetic-field concentrators. Electronic components are in particular magnetic core components as used in electrical, electromechanical and magnetic devices such as electromagnets, transformers, electric motors, inductors and magnetic assemblies. Further uses of the coated soft-magnetic powder include manufacture of Radio-Frequency Identification (RFID) tags and elements for reflecting or shielding electromagnetic radiation. In the production of RFID tags, which are labels in the size of rice grains for automatic object localization or identification, soft-magnetic powder may be employed in printing the RFID structure. Lastly, electronic components manufactured of soft-magnetic powder may be used for shielding electronic devices. In such applications, alternating magnetic field of the radiation causes the powder particles to continuously rearrange themselves. Due to the resulting friction, the powder particles convert the energy of the electromagnetic waves into heat.

EXAMPLES

Coating of Metal Powder—General Procedure a (Preparation Using a Planetary Mixer)

In a heatable planetary mixer 2700 kg carbonyl-iron-powder as for instance available from BASF with a purity of 99.5 g of iron content per 100 g and an average particle size d50 between 4.5 and 5 μm is added. The mixer is equipped with a condenser and flushed with argon to obtain an inert atmosphere. While stirring, 480 g ethanol is added. Subsequently, 75 wt.-% of the total amount of TEOS is added (the total amount of TEOS used in each experiment is given in Tables 1 to 6 below). Then, 80 wt.-% of the total amount of an aqueous $NH_3$ solution having a concentration of 5 wt.-% $NH_3$ is added (the total amount of the aqueous $NH_3$ solution used in each experiment is given in Tables 1 to 6 below). Now the temperature is raised to 60° C. while stirring. After stirring at this temperature for about 2 hours, the fluorination agent is added to the reaction mixture in form of a solution in ethanol with a concentration of about 10 to 15 wt.-%. The temperature is maintained while the remaining 25 wt.-% of TEOS and the remaining 20 wt.-% of the $NH_3$ solution is added over a time of about one hour. The mixture is stirred for further 45 minutes. The condenser is taken off and the product is stirred another hour. During that time the inert gas stream is increased to 600 I/h, already taking some solvent off. After one hour the temperature is raised to 90° C. and the product is stirred under the increased inert gas stream until being dry. The coated carbonyl-iron-powder is obtained as a gray powder.

Coating of Metal Powder—General Procedure B (Preparation in a Flask)

355 g ethanol is added to a flask equipped with a homogenizer (rotor/stator homogenizer available from Polytron®) and a condenser and flushed with argon to obtain an inert atmosphere. The homogenizer is set to 2000 rpm. While stirring, 500 g carbonyl-iron-powder as for instance available from BASF with a purity of 99.5 g of iron content per 100 g and an average particle size d50 between 4.5 and 5 μm is added. The homogenizer speed is increased to 6000 rpm.

Subsequently, 68 wt.-% of the total amount of TEOS is added (the total amount of TEOS used in each experiment is given in Table 7 below). Then, 100 wt.-% of the total amount of an aqueous $NH_3$ solution having a concentration of 2.5 wt.-% $NH_3$ is added (the total amount of the aqueous $NH_3$ solution used in each experiment is given in Table 7 below). Now the temperature is raised to 45° C. for 20 min, then to 55° C. for 20 min and finally to 65 min for 20 min while stirring. After stirring at this temperature for about 1 further hour, the fluorination agent is added to the reaction mixture in form of a solution in ethanol with a concentration of about 10 to 15 wt.-%. The temperature is maintained while the remaining 32 wt.-% of TEOS is quickly added. The mixture is stirred for 1 further hour. The product is stirred for about 3 hours at 95° C. at an inert gas stream of 600 I/h and 47 rpm in a planetary mixer until the solvent is taken off. The dried coated carbonyl-iron-powder is obtained as a gray powder.

Mixing with Epoxy Resin 100 g of the coated carbonyl iron powder (CIP) were mixed with epoxy resin, e.g. Epikote™ 1004 available from Momentive, by dissolving 2.8 g epoxy resin in 15 to 20 mL of solvent (methylethylketone or acetone) and addition of 0.14 g of dicyandiamide, e.g. Dyhard® 100SH available from Alzchem, as hardener. In a glass beaker the coated CIP is stirred together with the epoxy formulation using a dissolver mixer at 1000 R/min. After mixing the slurry is poured in an aluminum plate, which is then put in a fume hood for 8 h. The resulting dry CIP epoxy plate is milled in a knife mill for 10 seconds to yield the ready to press powder. It comprises 2.8 wt.-% of epoxy resin.

Molding and Wiring of Ring Core 6.8 g (±0.1 g) of the ready to press powder is put into a steel mold of ring type with an outer diameter of 20.1 mm and an inner diameter of 12.5 mm resulting in a height of approximately 5 6 mm. The ready to press powder is molded at 440 MPa for a couple of seconds. From the exact mass and height of the ring the density of the ring core is calculated. The ring core is wired with 20 windings of an isolated 0.85 mm copper wire, e.g. Isodraht available from Multogan 2000MH 62, for determination of the permeability and resistivity.

Measurement of Permeability and Resistivity

An LRC meter was used to measure permeability of a ring core. All measurements were done at 100 kHz with 0V DC bias. The test AC current of 10 mA was applied to the ring core.

To measure the resistivity of the pressed parts, a power supply was connected in series to a voltmeter and a sample. 298 Volts were applied to a multimeter and the sample connected in series. Voltage reading of a multimeter was used to estimate the resistance of the sample using following equation.

$$R_{sample}=R_{meter}\times(V_{PS}-V_{meter})V_{meter},$$

where $R_{sample}$ is the resistance of the cylinder, $R_{meter}$ is the internal resistance of the meter, $V_{PS}$ is the applied voltage from power supply (=298 V), and $V_{meter}$ is the reading from the voltmeter.

Temperature Stability

Before the temperature stability test can start the epoxy is cured. This is done by placing the ring cores in oven set to 70° C. After 2 h the ring cores are placed into a second oven set to 155° C. After 2 h the ring cores are taken out for resistivity testing.

Now the ring cores are placed again into an oven set to 180° C. for an amount of time. The temperature stability after 24 h e.g. is measured after additional 24 h of temperature treatment at 180° C. The ring core is labeled as temperature stable if the measured voltage is about 0 V after 24 h at 180° C. and ≤30 V, preferably ≤25 V, and in particular ≤20 V, after 48 h at 180° C. In a further preferred embodiment, the measured voltage is preferably ≤70 V, more preferred ≤30 V, and in particular ≤10 V after 120 h at 180° C.

Test Results

After temperature treatment of the compacted samples the permeability and the resistivity were determined as described above. The results are given in Tables 1 to 7. Corrosion testes are summarized in Table 8.

In Table 1, examples E-1 to E-3 and Comparative Examples C-1 and C-2 are summarized. The examples and comparative examples allow the comparison of coated carbonyl iron powder (CIP) using different fluorination agents under otherwise identical conditions. As can be seen from the results, all compounds exhibit good to excellent properties with respect to permeability as well as heat resistance after the specified amounts of time.

As demonstrated by Examples E-4 to E-8 shown in Table 2, the fluorination agents in accordance with the present invention allow a considerable reduction of the amounts used for achieving excellent results in resistivity. Starting from 9.6 mmol fluorination agent per 1 kg of CIP, the amount typically employed in EP 2 871 646 A1, the amount of fluorination agent may be reduced by about 30% to 6.70 mmol/kg without negative effects on heat stability if $HBF_4$ is used. In fact, the reduction results in slight improvements with respect to resistivity after 48 h.

Table 3 demonstrates different reaction conditions by means of different ratios of TEOS, ammonia and floriation agent which allow influencing the product properties. As can be seen, particularly good properties with respect to resistivity as well as permeability are achieved if the molar ratio of ammonia to TEOS is within the range of 1:1.1 to 1:1.8.

Examples E-16 to E-19 in Table 4 demonstrate that the amount of fluorination agent may be significantly reduced, if $[NH_3EtOH][BF_4]$ is used, compared to $BF_3NH_2$—$CH_2$-Ph (cf. Comparative Example CE-4).

Table 5 shows that using $[NH_3EtOH][BF_4]$ as fluorination agent allows a further reduction of the used amount of $SiO_2$ and fluorination agent compared to $BF_3$—$NH_2$—$CH_2$-Ph. In particular, the amount of fluorination agent may be reduced by about 65 mol-%, the amount of TEOS may be reduced by 10 mol-% and the amount of $NH_3$ solution can be reduced by 20 wt.-% when $[NH_3EtOH][BF_4]$ is used compared to $BF_3NH_2$—$CH_2$-Ph without significant deterioration of the product properties.

Table 6 compares the use of $[NH_3EtOH][BF_4]$ as fluorination agent with the known fluorination agent $BF_3{\cdot}NH_2$—$CH_2$-Ph in different combinations with respect to the amounts of $SiO_2$ and $NH_3$ solution whereas the amount of fluorine atoms is kept approximately constant in the example pairs CE-6/E25, CE-7/E26, CE-8/E-7, and CE-9/E8. As can be seen from these examples and comparative examples, the comparative examples using $BF_3{\cdot}NH_2$—$CH_2$-Ph typically result in higher voltages after exposing the prepared ring core to an increased temperature (i.e. higher resistivity). On the other hand, the test specimen using $BF_3{\cdot}NH_2$—$CH_2$-Ph often exhibit a lower permeability. By contrast, the examples according to the present invention using $[NH_3EtOH][BF_4]$ exhibit a unique combination of comparably high permeability and low resistivity (i.e. measured voltage) after exposing to an increased temperature. For example, by comparing the examples which exhibit a permeability of about 17 (+/−0.05) (i.e. examples E-26, CE-8 and CE-9) it is evident that according to the present invention a similar permeability is achieved while the resistivity is distinctly lower after 48 h at 180° C. (15 V for E-26, 143 V for CE-8 and 105 V for CE-9).

Table 7 shows the test results of two Examples E-29 and E-30 which were both exposed to 180° C. for 120 h. both examples show excellent results with respect to permeability, as well as resistivity.

TABLE 1

Examples E-1 to E-3 and Comparative Examples CE-1 and CE-2 prepared according to General procedure A.

| Ex. No | Amount TEOS [g] | Amount TEOS [mol] | Amount $SiO_2$ with respect to total weight of CIP [mmol/kg] | Fluorination agent (solution in ethanol) | Amount Fluorination agent [g] | Amount fluorination agent [wt.-% with respect to total weigh of CIP] | Amount fluorination agent with respect to total weight of CIP [mmol/kg] | Permeability (dry) | Voltage measured after 24 h at 180° C. [V] | Voltage measured after 48 h at 180° C. [V] |
|---|---|---|---|---|---|---|---|---|---|---|
| E-1 | 96.9 | 0.46 | 172.28 | $HBF_4$ (solution of 10 wt.-%) | 22.68 | 0.084 | 9.57 | 16.63 | 0.00 | 4.34 |
| E-2 | 96.9 | 0.46 | 172.28 | $NH_4BF_4$ (solution of 10 wt.-%) | 27.00 | 0.100 | 9.57 | 15.9 | 0 | 5.1 |
| E-3 | 96.9 | 0.46 | 172.28 | $[BF_4][H_3N—CH_2—Ph]$ (solution of 15 wt.-%) | 30.30 | 0.167 | 8.63 | 17.70 | 0.02 | 28.28 |
| CE-1 | 96.9 | 0.46 | 172.28 | $H_2SiF_6$ (solution of 15 wt.-%) | 24.80 | 0.138 | 9.57 | 16.10 | 0.00 | 3.50 |
| CE-2 | 96.9 | 0.46 | 172.28 | $BF_3•NH_2—CH_2—Ph$ (solution of 15 wt.-%) | 30.39 | 0.167 | 9.57 | 16.4 | 0 | 19 |

TABLE 2

Examples E-4 to E-8 prepared according to General procedure A.

| Ex. No. | Amount TEOS [g] | Amount TEOS [mol] | Amount $SiO_2$ with respect to total weight of CIP [mmol/kg] | Amount $NH_3$ solution [g] | Fluorination agent (solution in ethanol) | Amount Fluorination agent [g] | Amount fluorination agent [wt.-% with respect to total weigh of CIP] | Amount fluorination agent with respect to total weight of CIP [mmol/kg] | Permeability (dry) | Voltage measured after 24 h at 180° C. [V] | Voltage measured after 48 h at 180° C. [V] |
|---|---|---|---|---|---|---|---|---|---|---|---|
| E-4 | 96.9 | 0.46 | 172.28 | 134.9 | $HBF_4$ (solution of 10 wt.-%) | 22.7 | 0.084 | 9.57 | 16 | 0 | 3.9 |
| E-5 | 96.9 | 0.46 | 172.28 | 134.9 | $HBF_4$ (solution of 10 wt.-%) | 18.1 | 0.067 | 7.65 | 16.1 | 0 | 3.4 |
| E-6 | 96.9 | 0.46 | 172.28 | 134.9 | $HBF_4$ (solution of 10 wt.-%) | 15.9 | 0.059 | 6.70 | 15.9 | 0 | 3.8 |
| E-7 | 96.9 | 0.46 | 172.28 | 134.9 | $HBF_4$ (solution of 10 wt.-%) | 13.5 | 0.050 | 5.74 | 16.3 | 0 | 30 |
| E-8 | 96.9 | 0.46 | 172.28 | 134.9 | $HBF_4$ (solution of 10 wt.-%) | 11.3 | 0.042 | 4.78 | 17.1 | 0.8 | 83 |

TABLE 3

Examples E-9 to E-15 and Comparative Example CE-3 prepared according to General procedure A.

| Ex. No. | Amount TEOS [g] | Amount TEOS [mol] | Amount $SiO_2$ with respect to total weight of CIP [mmol/kg] | Amount $NH_3$ solution [g] | Fluorination agent (solution in ethanol) | Amount Fluorination agent [g] | Amount fluorination agent [wt.-% with respect to total weigh of CIP] | Amount fluorination agent with respect to total weight of CIP [mmol/kg] | Permeability (dry) | Voltage measured after 24 h at 180° C. [V] | Voltage measured after 48 h at 180° C. [V] |
|---|---|---|---|---|---|---|---|---|---|---|---|
| E-9 | 96.9 | 0.46 | 172.28 | 94.4 | $HBF_4$ (solution of 10 wt.-%) | 15.93 | 0.059 | 6.70 | 17.2 | 0.14 | 39 |
| E-10 | 96.9 | 0.46 | 172.28 | 107.9 | $HBF_4$ (solution of 10 wt.-%) | 15.93 | 0.059 | 6.70 | 17.5 | 0 | 3 |

TABLE 3-continued

Examples E-9 to E-15 and Comparative Example CE-3 prepared according to General procedure A.

| Ex. No. | Amount TEOS [g] | Amount TEOS [mol] | Amount $SiO_2$ with respect to total weight of CIP [mmol/kg] | Amount $NH_3$ solution [g] | Fluorination agent (solution in ethanol) | Amount Fluorination agent [g] | Amount fluorination agent [wt.-% with respect to total weigh of CIP] | Amount fluorination agent with respect to total weight of CIP [mmol/kg] | Permeability (dry) | Voltage measured after 24 h at 180° C. [V] | Voltage measured after 48 h at 180° C. [V] |
|---|---|---|---|---|---|---|---|---|---|---|---|
| E-11 | 87.2 | 0.41 | 155.05 | 134.9 | $HBF_4$ (solution of 10 wt.-%) | 18.09 | 0.067 | 7.65 | 16.8 | 0 | 9 |
| E-12 | 77.5 | 0.37 | 137.82 | 134.9 | $HBF_4$ (solution of 10 wt.-%) | 22.68 | 0.084 | 9.57 | 17.5 | 0.5 | 63 |
| E-13 | 82.4 | 0.39 | 146.43 | 134.9 | $HBF_4$ (solution of 10 wt.-%) | 20.41 | 0.076 | 8.63 | 16.6 | 0.23 | 46 |
| E-14 | 96.9 | 0.46 | 172.28 | 101.2 | $HBF_4$ (solution of 10 wt.-%) | 15.93 | 0.059 | 6.70 | 16.3 | 0 | 3.3 |
| E-15 | 87.2 | 0.41 | 155.05 | 107.9 | (solution of 10 wt.-%) | 18.09 | 0.067 | 7.65 | 16.4 | 0 | — |
| CE-3 | 96.9 | 0.46 | 172.28 | 134.9 | $BF_3$•$NH_2$—$CH_2$—Ph (solution of 15-wt.-%) | 30.30 | 0.167 | 9.57 | 16.4 | 0 | 19 |

TABLE 4

Examples E-16 to E-19 and Comparative Example CE-4 prepared according to General procedure A.

| Ex. No. | Amount TEOS [g] | Amount TEOS [mol] | Amount $SiO_2$ with respect to total weight of CIP [mmol/kg] | Amount $NH_3$ solution [g] | Fluorination agent (solution in ethanol) | Amount Fluorination agent [g] | Amount fluorination agent [wt.-% with respect to total weigh of CIP] | Amount fluorination agent with respect to total weight of CIP [mmol/kg] | Permeability (dry) | Voltage measured after 24 h at 180° C. [V] | Voltage measured after 48 h at 180° C. [V] |
|---|---|---|---|---|---|---|---|---|---|---|---|
| E-16 | 96.9 | 0.46 | 172.28 | 134.9 | $[NH_3EtOH][BF_4]$ (solution of 10 wt.-%; molar ratio N:B = 1.785:1) | 28.08 | 0.104 | 5.30 | 16.55 | 0.00 | 1.6 |
| E-17 | 96.9 | 0.46 | 172.28 | 134.9 | $[NH_3EtOH][BF_4]$ (solution of 10 wt.-%; molar ratio N:B = 1.785:1) | 22.68 | 0.084 | 4.24 | 16.5 | 0 | 7.5 |
| E-18 | 96.9 | 0.46 | 172.28 | 101.2 | $[NH_3EtOH][BF_4]$ (solution of 10 wt.-%; molar ratio N:B = 1.785:1) | 22.68 | 0.084 | 4.24 | 16.51 | 0 | 0.5 |
| E-19 | 87.2 | 0.41 | 155.05 | 107.9 | $[NH_3EtOH][BF_4]$ (solution of 10 wt.-%; molar ratio N:B = 1.785:1) | 22.68 | 0.084 | 4.24 | 16.85 | 0 | 5.15 |
| CE-4 | 96.9 | 0.46 | 172.28 | 134.9 | $BF_3$•$NH_2$—$CH_2$—Ph (solution of 15 wt.-%) | 30.30 | 0.167 | 9.57 | 16.7 | 0 | 11 |

TABLE 5

Examples E-20 to E-24 and Comparative Example CE-5 prepared according to General procedure A.

| Ex. No. | Amount TEOS [g] | Amount TEOS [mol] | Amount $SiO_2$ with respect to total weight of CIP [mmol/kg] | Amount $NH_3$ solution [g] | Fluorination agent (solution of 15 wt.-%) | Amount Fluorination agent [g] | Amount fluorination agent [wt.-% with respect to total weigh of CIP] | Amount fluorination agent with respect to total weight of CIP [mmol/kg] | Permeability (dry) | Voltage measured after 48 h at 180° C. [V] |
|---|---|---|---|---|---|---|---|---|---|---|
| E-20 | 96.9 | 0.46 | 172.28 | 134.9 | $[NH_3EtOH][BF_4]$ (molar ratio N:B = 1.3:1) | 14.22 | 0.079 | 4.70 | 16.43 | 0.85 |
| E-21 | 87.2 | 0.41 | 155.05 | 107.9 | $[NH_3EtOH][BF_4]$ (molar ratio N:B = 1.3:1) | 17.01 | 0.063 | 3.76 | 17.2 | 4 |
| E-22 | 96.9 | 0.46 | 172.28 | 101.2 | $[NH_3EtOH][BF_4]$ (molar ratio N:B = 1.3:1) | 14.85 | 0.055 | 3.29 | 17.8 | 9.5 |
| E-23 | 87.2 | 0.41 | 155.05 | 101.2 | $[NH_3EtOH][BF_4]$ (molar ratio N:B = 1.3:1) | 17.01 | 0.063 | 3.76 | 17.7 | 11 |
| E-24 | 87.2 | 0.41 | 155.05 | 107.9 | $[NH_3EtOH][BF_4]$ (molar ratio N:B = 1.3:1) | 14.85 | 0.055 | 3.29 | 17.6 | 15 |
| CE-5 | 96.9 | 0.46 | 172.28 | 134.9 | $BF_3$•$NH_2$—$CH_2$—Ph | 30.3 | 0.167 | 9.57 | 17.1 | 16.5 |

TABLE 6

Examples E-25 to E-28 and Comparative Examples CE-6 to CE-9 prepared according to General procedure A.

| Ex. No. | A-mount TEOS [g] | A-mount TEOS [mol] | Amount $SiO_2$ with respect to total weight of CIP [mmol/kg] | A-mount $NH_3$ solution [g] | Fluorination agent (solution of 15 wt.-%) | Amount fluorination agent [g] (15 wt. % in Ethanol) | Amount fluorination agent [wt.-% with respect to total weight of CIP] | Amount fluorination agent with respect to total weight of CIP [mmol/kg] | Amount fluorine atoms with respect to total weight of CIP [mmol/kg] | Perme-ability (dry) | Voltage measured after 24 h at 180° C. [V] | Voltage measured after 48 h at 180° C. [V] |
|---|---|---|---|---|---|---|---|---|---|---|---|---|
| CE-6 | 96.9 | 0.46 | 172.28 | 134.9 | $BF_3$•$NH_2$—$CH_2$—Ph | 30.3 | 0.167 | 9.57 | 28.71 | 16.3 | 0 | 8 |
| E-25 | 96.9 | 0.46 | 172.28 | 134.9 | $[NH_3EtOH][BF_4]$ (molar ratio N:B = 1.3:1) | 21.76 | 0.121 | 7.19 | 28.76 | 15.25 | 0 | 0.25 |
| CE-7 | 87.2 | 0.41 | 155.05 | 101.2 | $BF_3$•$NH_2$—$CH_2$—Ph | 15.77 | 0.087 | 4.98 | 14.94 | 16.6 | 0.5 | 77 |
| E-26 | 87.2 | 0.41 | 155.05 | 101.2 | $[NH_3EtOH][BF_4]$ (molar ratio N:B = 1.3:1) | 11.38 | 0.063 | 3.76 | 15.04 | 17.05 | 0 | 15 |
| CE-8 | 87.2 | 0.41 | 155.05 | 107.9 | $BF_3$•$NH_2$—$CH_2$—Ph | 13.94 | 0.077 | 4.4 | 13.2 | 16.95 | 1.4 | 143 |
| E-27 | 87.2 | 0.41 | 155.05 | 107.9 | $[NH_3EtOH][BF_4]$ (molar ratio N:B = 1.3:1) | 9.95 | 0.055 | 3.29 | 13.16 | 16.45 | 0 | 37 |
| CE-9 | 89.1 | 0.43 | 160.22 | 101.2 | $BF_3$•$NH_2$—$CH_2$—Ph | 19.7 | 0.109 | 6.22 | 18.66 | 17 | 0.2 | 105 |
| E-28 | 89.1 | 0.43 | 160.22 | 101.2 | $[NH_3EtOH][BF_4]$ (molar ratio N:B = 1.3:1) | 14.22 | 0.079 | 4.7 | 18.8 | 16.2 | 0 | 3 |

TABLE 7

Examples E-29 and E-30 prepared according to General Procedure B

| Ex. No. | Amount TEOS [g] | Amount TEOS [mmol] | Amount $SiO_2$ with respect to total weight of CIP [mmol/kg] | Amount $NH_3$ solution [g] | Fluorination agent | Amount fluorination agent [g] (15 wt. % in ethanol) | Amount fluorination agent [wt.-% with respect to total weight of CIP] | Amount fluorination agent with respect to total weight of CIP [mmol/kg] | Perme-ability (dry) | Voltage measured after 48 h at 180° C. [V] | Voltage measured after 96 h at 180° C. [V] | Voltage measured after 120 h at 180° C. [V] |
|---|---|---|---|---|---|---|---|---|---|---|---|---|
| E-29 | 17 | 81.6 | 163.21 | 60 | $[NH_3EtOH][BF_4]$ | 2.6 | 0.078 | 4.7 | 16.65 | 0 | 0 | 1.1 |
| E-30 | 17 | 81.6 | 163.21 | 60 | $[NH_3EtOH][BF_4]$ | 2.6 | 0.078 | 4.7 | 17.2 | 0 | 0 | 0.5 |

Corrosion Tests

Corrosion of different stainless steel materials was tested by exposing the samples (dimensions: 50×20×2 mm) of the stainless steel materials (tested materials include according to DIN EN 10027-2: 1.4541, 1.4571, 1.4462, 1.0425) to the respective additive solution at T=60° C. for 4×7 days wherein the solution is replaced by a fresh solutions every week. The test was carried out in a PTFE vessel equipped. The test results are summarized in Table 8.

TABLE 8

Results of the corrosion tests

| Additive solution | pH | corrosion |
|---|---|---|
| $[NH_3EtOH][BF_4]$ (15 wt.- % in ethanol) | 6 | no |
| $BF_3{\cdot}NH_2$-$CH_2$-Ph (15 wt.- % in ethanol) | 4 | no/little |
| HBF4 (3 wt. % in ethanol) | 3 | little |
| HBF4 (10 wt. % in ethanol) | 3 | little/strong |
| HBF4 (10 wt. % in water) | 0-1 | strong |

As can be seen, a solution of $HBF_4$-results in little to strong corrosion of stainless steel materials depending on the solvent used. By contrast, $BF_3{\cdot}NH_2$—$CH_2$-Ph (15 wt.-% in ethanol) and $[NH_3EtOH][BF_4]$ (15 wt.-% in ethanol) show substantially no or little corrosion. From the viewpoint of product purity, $NH_3EtOH][BF_4]$ and $BF_3{\cdot}NH_2$—$CH_2$-Ph are therefore preferred in the process for coating a soft-magnetic powder compared to $HBF_4$. However, the latter one may be used in low concentrations (i.e. 3 wt.-% in ethanol).

From the above, the advantages of the present invention may be summarized as follows. The use of a fluorination agent according to formula (II) in a process for coating a soft-magnetic powder, wherein coating comprising at least one fluorine containing composition containing a composition of formula (I), allows the provision of a coated soft-magnetic powder having a higher permeability at a comparable resistivity compared to known fluorination agents. On the other hand, a higher resistivity at comparable permeability may be achieved. Moreover, the fluorination agent according to the present invention is more stable in solution, less prone to precipitate from solution (i.e. has a higher solubility), shows an improved material compatibility (in particular with regard to corrosion) and an improved manageability.

The invention claimed is:

1. A process for coating a soft-magnetic powder, the coating comprising at least one fluorine containing composition containing a composition of formula (I):

$$1.Si_{1-0.75c}M_cO_{2-0.5c}F_d \quad (I)$$

wherein c is in the range of 0.01 to 0.5, d is in the range of 0.04 to 2, and

M is B or Al, wherein the soft-magnetic powder is mixed with a silicon-based solution containing at least one soluble fluorination agent, wherein the at least one soluble fluorination agent is a compound of formula (II)

$$[Q][MF_4] \quad (II)$$

wherein

M is B or Al; and

Q is a cationic group selected from $H^+$, $Na^+$, $K^+$, $Rb^+$, $Cs^+$ or $[NR^1_4]^+$, wherein $R^1$ is independently selected from the group consisting of —H, —$C_{1-12}$-alkyl, —$C_{2-12}$-alkenyl, and —$C_{6-18}$-aryl, each of which may be substituted with at least one group represented by the formula —$OR^2$, wherein $R^2$ is independently selected from —H, —$C_{1-12}$-alkyl, —$C_{2-12}$-alkenyl, and —$C_{1-18}$-aryl.

2. The process as claimed in claim 1, wherein the soft-magnetic powder is mixed with a silicon-based solution and the at least one soluble fluorination agent is added after at least partial treatment of the soft-magnetic powder with the silicon-based solution.

3. The process as claimed in claim 1, wherein the at least one soluble fluorination agent is a compound of formula (II)

$$[Q][MF_4] \quad (II)$$

wherein

M is selected from B, and

Q is cationic group selected from $H^+$ or $[NR^1_4]^+$, wherein $R^1$ is independently selected from the group consisting of —H, —$C_{1-12}$-alkyl, —$C_{2-12}$-alkenyl, and —$C_{6-18}$-aryl, each of which may be substituted with at least one group represented by the formula —$OR^2$, wherein $R^2$ is independently selected from —H, —$C_{1-12}$-alkyl, —$C_{2-12}$-alkenyl, and —$C_{1-18}$-aryl.

4. The process as claimed in claim 1, wherein the soluble fluorination agent is selected from the group consisting of $HBF_4$, $[NH_4][BF_4]$, and $[(R^4—OR^3)_x—NH_{3-x}][BF_4]$, wherein $R^3$ represents a group of the formula —$(C_nH_{2n+p})$—;

n is an integer from 1 to 6, p is an integer selected from 0 and −2, $R^4$ is selected from —H or —$(C_mH_{2m+q})$—$CH_3$, m is an integer from 0 to 6, q is an integer selected from 0 and −2, with the proviso that when m=0 then q=0, and x is an integer selected from 1 to 3.

5. The process as claimed in claim 1, wherein the soluble fluorination agent has a solubility in ethanol at 0° C. of at least 15 wt.-%.

6. The process as claimed in claim 1, wherein the soluble fluorination agent is added during treatment with the silicon-based solution or immediately after the treatment with the silicon-based solution.

7. The process as claimed in claim 1, wherein 0.1 to 10 mmol of fluorination agent per kg of soft-magnetic powder is added to the silicon-based solution.

8. The process as claimed in claim 1, wherein the silicon-based solution contains a silicon alkoxide, which is added in one or more steps to the reaction mixture.

9. A soft-magnetic powder coated with a silicon-based coating, wherein the silicon-based coating comprises at least one fluorine containing composition of formula (I):

$$Si_{1.075-c}M_cO_{2-0.5c}F_d \quad (I)$$

wherein c is in the range of 0.01 to 0.5, d is in the range of 0.04 to 2, the index c and the index d have the following relation: d=4c and M is B or Al, wherein the silicon-based coating comprises between greater than 5 to 45 wt.-% of the at least one fluorine containing composition of formula (I).

10. The soft-magnetic powder as claimed in claim 9, comprising at least one fluorine containing composition of formula (I), wherein M is B.

11. The soft-magnetic powder as claimed in claim 9, wherein the silicon-based coating comprises 20 to 35 wt.-%, of the at least one fluorine containing composition of formula (I).

12. The soft-magnetic powder as claimed in claim 9, wherein the fluorine component of the fluorine containing composition is embedded within a $SiO_2$-matrix and/or bonded to a surface of a $SiO_2$-coating.

13. The soft-magnetic powder as claimed in claim 9, wherein the silicon-based coating has an average thickness of 2 to 100 nm.

14. The soft-magnetic powder of as claimed in claim 9, wherein the soft magnetic powder comprises 0.1 to 10 wt.-% of the silicon based coating based on the total weight of the soft magnetic powder.

15. An electronic component comprising the soft-magnetic powder as claimed in claim 9.

* * * * *